Jan. 28, 1969  G. W. BLOOMQUIST  3,423,813
METHOD OF MAKING RACE INSERTS
Filed March 28, 1966
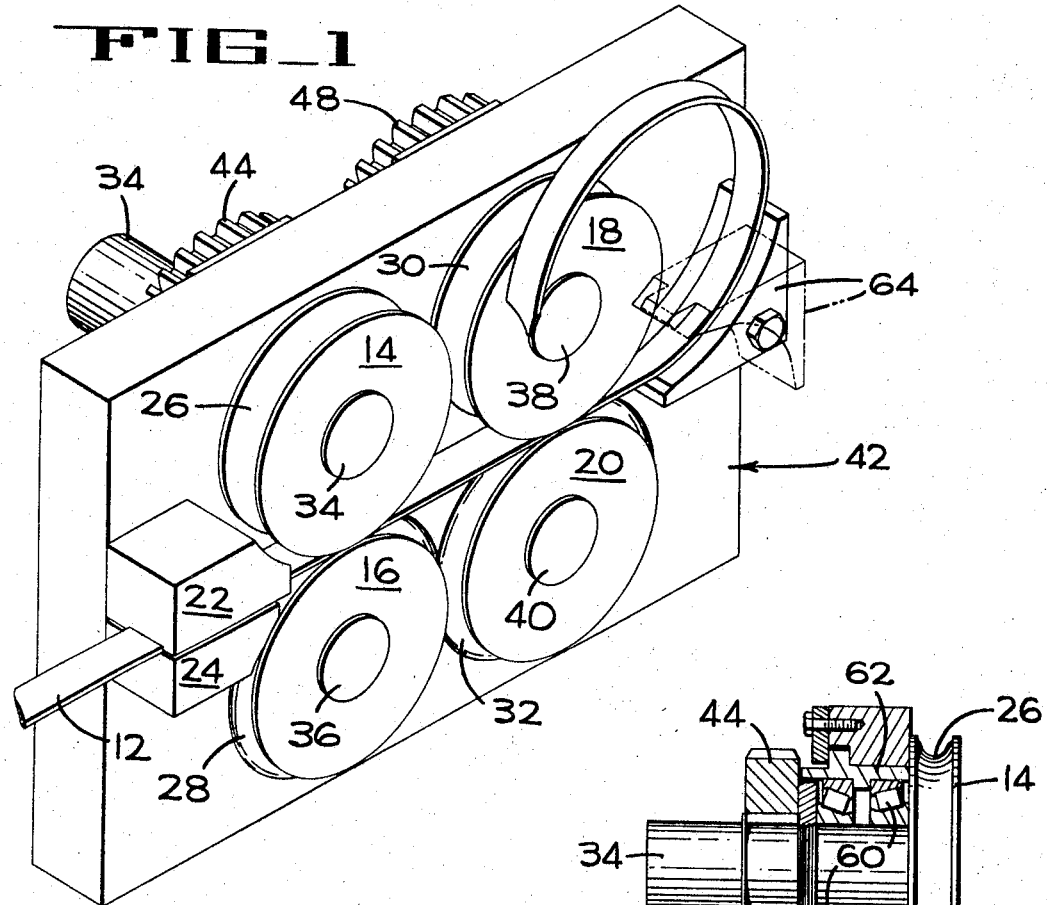
FIG_1
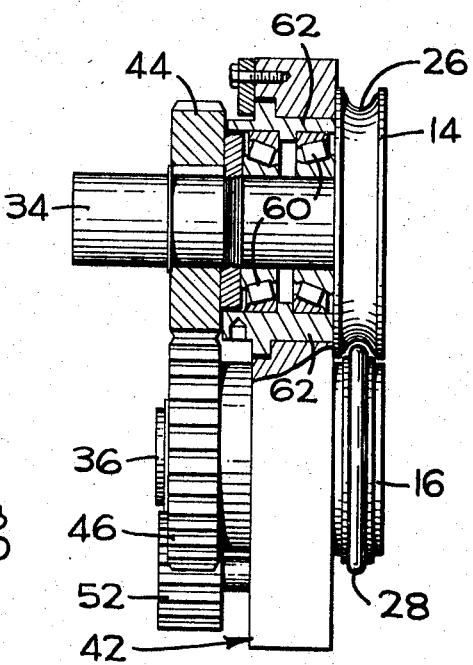
FIG_7
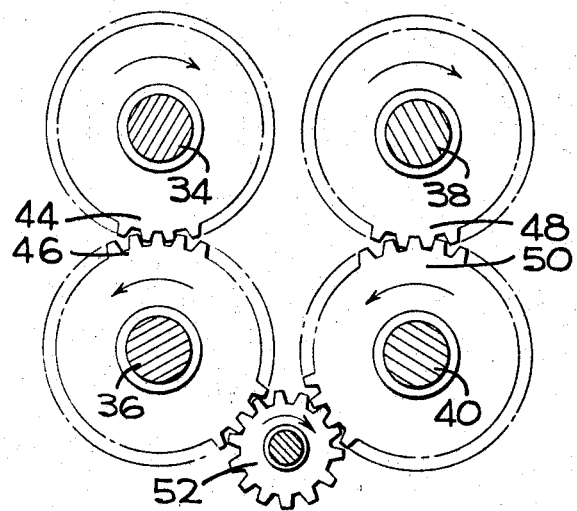
FIG_6
INVENTOR
GEORGE W. BLOOMQUIST
BY Francis W. Anderson ATTORNEY

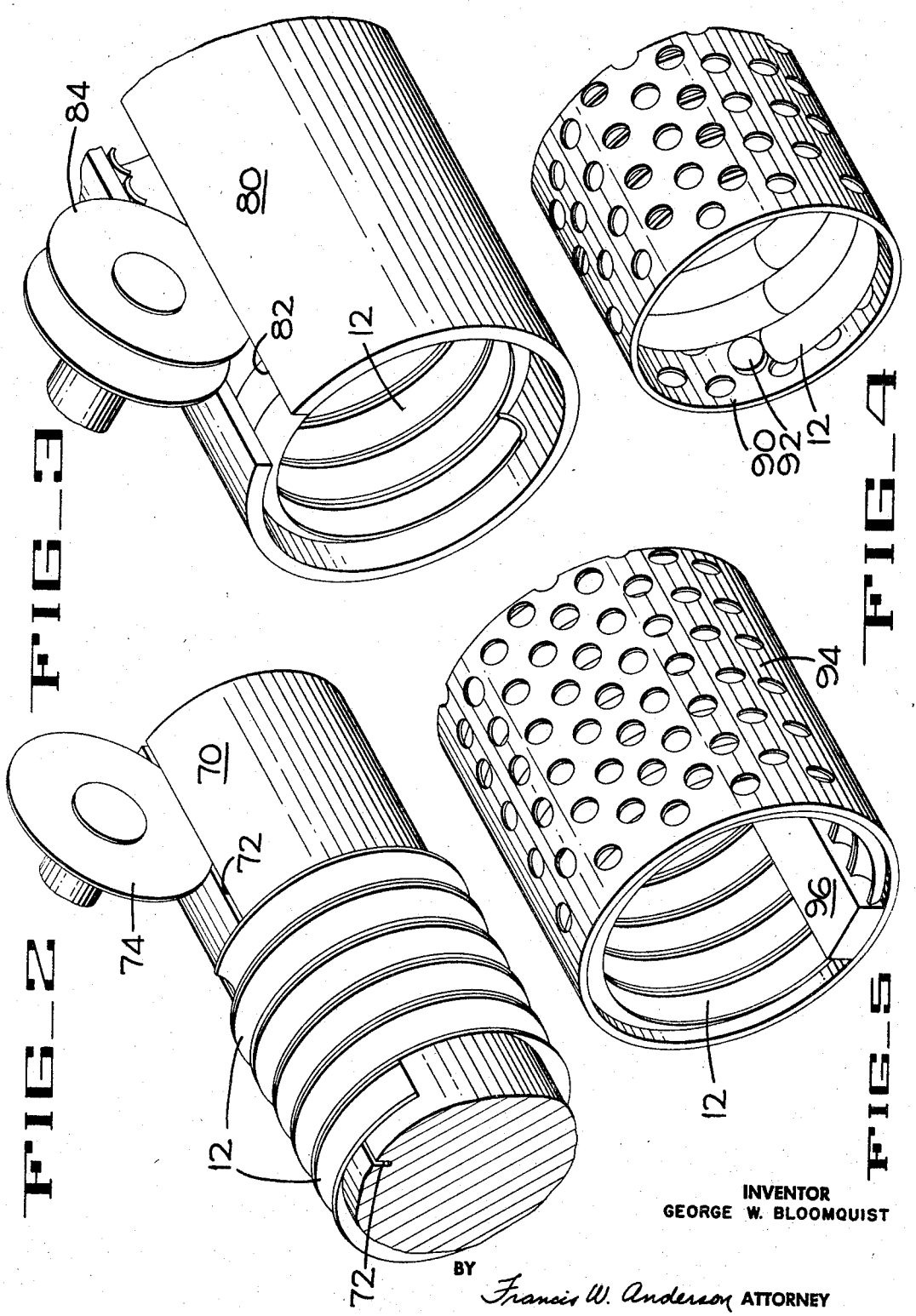

Jan. 28, 1969  G. W. BLOOMQUIST  3,423,813
METHOD OF MAKING RACE INSERTS
Filed March 28, 1966
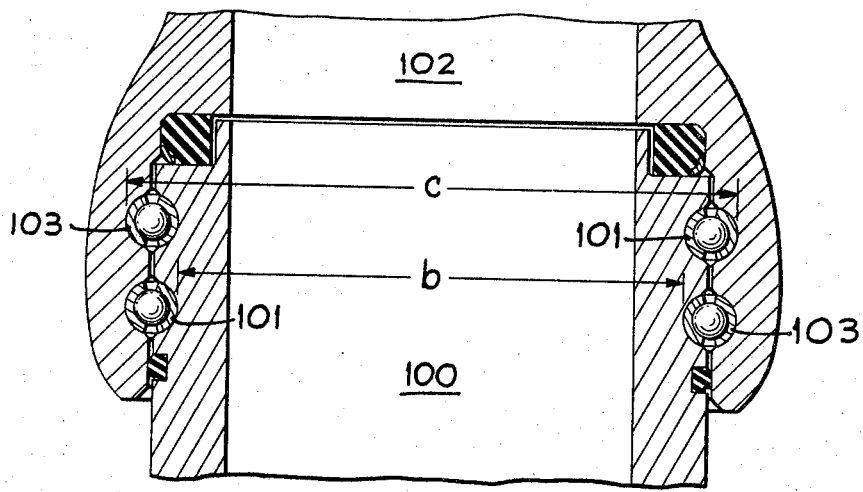
FIG_8
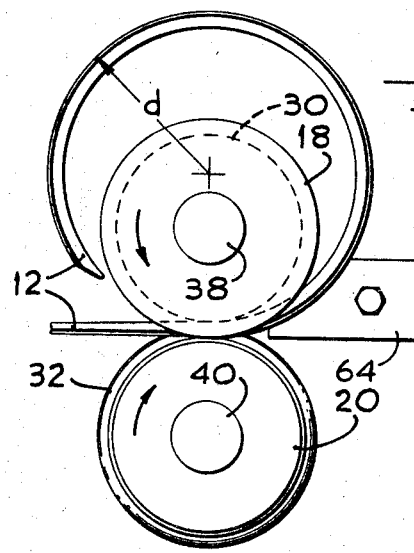
FIG_9
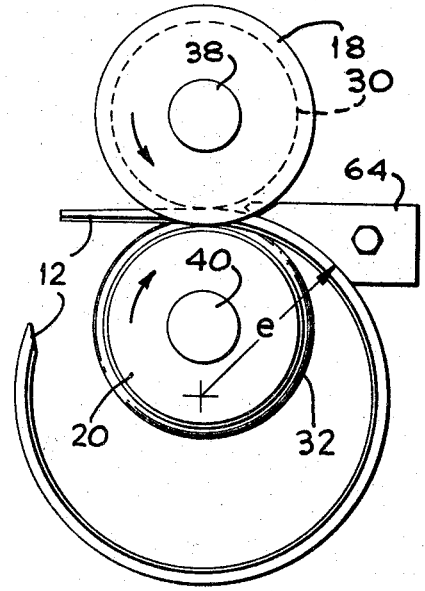
FIG_10
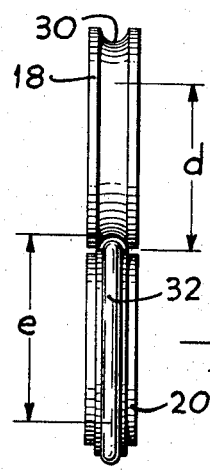
FIG_11
INVENTOR
GEORGE W. BLOOMQUIST
BY Francis W. Anderson
ATTORNEY

United States Patent Office 3,423,813
Patented Jan. 28, 1969

3,423,813
METHOD OF MAKING RACE INSERTS
George W. Bloomquist, Long Beach, Calif., assignor to FMC Corporation, San Jose, Calif., a corporation of Delaware
Filed Mar. 28, 1966, Ser. No. 537,922
U.S. Cl. 29—148.4      5 Claims
Int. Cl. F16c 33/64; B21h 1/12

ABSTRACT OF THE DISCLOSURE

A method of making bearing race inserts involving shaping a blank, such as an elongated metal strip, relative to its longitudinal centerline to give it a curved transverse cross-section, curling the shaped strip about a transverse axis to form a helical coil, and severing the coil longitudinally to separate it into a plurality of individual ring-like race inserts. The inserts also may be shaped individually from blanks of properly pre-cut lengths, and the inserts made by either procedure may then be heat-treated to increase their hardness.

---

This invention relates to a method of forming race inserts for bearings. In particular, the method pertains to forming inner and outer race inserts for use in bearings employed to permit relative rotational movement between tubular conduits.

Tubular conduits are often connected for relative rotational movement by devices commonly known as swivel joints. A swivel joint generally comprises an outer member having an annular, transversely concave bearing race; and an inner member circumscribed by an annular, transversely concave bearing race. The inner member is fitted into the outer member in a manner such that their respective concave races are positioned in confronting relation so as to retain a plurality of balls. Usually these races include metallic inserts which are mounted in annular grooves formed in each member.

Heretofore, hardened ball bearing race inserts for swivel joints have been made by casting steel rings into the outer and inner members of the swivel joint. These rings must then be machined into their concave shapes and heat-treated while being a part of the members. The process is expensive and only certain materials can be processed in such a manner. Other methods employed in making race inserts include pre-machining them and securing them to the outer and inner members of the housing by screws, pins, etc. When races of this type are subjected to heat or cold, they tend to become loose or sometimes break when used with metals having different shrinking factors.

While the application of this method will be described with reference to ball bearing race inserts used in swivel joints, it is not intended that the invention should be in any way limited to such an application since the method described and claimed hereinafter will be applicable equally to making different types of bearing race inserts having many other uses.

It is an object, therefore, of this invention to provide an improved method of making bearing race inserts.

Another object of this invention is to provide a method of making a readily insertable bearing race insert for either the outer or inner member of two interconnected tubular conduits.

Another object of this invention is to provide a method for making ball bearing race inserts by the use of rollers.

Another object of this invention is to form the transverse radius and diameter of a bearing race insert simultaneously in a single operation.

Other objects will become apparent from the following detailed description and figures of the drawing in which:

FIGURE 1 is a schematic isometric showing an inner race insert during initial forming steps.

FIGURE 2 is a schematic isometric of an inner race insert during a cutting operation.

FIGURE 3 is a schematic isometric of an outer race insert during a cutting operation.

FIGURE 4 is a schematic isometric of an inner race insert during a heat treating operation.

FIGURE 5 is a schematic isometric of an outer race insert during a heat treating operation.

FIGURE 6 is a schematic of the gear train used for driving the rollers during the operation shown in FIGURE 1.

FIGURE 7 is a schematic end elevation, partially broken away, of the apparatus shown in FIGURE 1.

FIGURE 8 is a longitudinal section of a typical swivel joint with the inserts shown in their operating positions.

FIGURE 9 is a schematic elevation of the apparatus shown in FIGURE 1 showing an inner race insert during an initial forming operation.

FIGURE 10 is a schematic elevation of the apparatus shown in FIGURE 1 showing an outer race insert during an initial forming operation.

FIGURE 11 is a schematic end elevation with parts broken away of the apparatus shown in FIGURE 9.

In general the method of this invention comprises the steps of bending a blank, such as an elongated strip of metal, relative to its longitudinal centerline to give the strip a uniformly curved transverse cross-section and then curling the strip about a transverse axis to form an intermediary in the form of a coil. The bending is carried out in such a manner that the transverse curvature of the strip adapts it to accommodate balls of predetermined diameters, and the diameter of the coil is of a predetermined dimension.

After the coil has been formed it is placed over a mandrel, as in the case of the coil (FIG. 2) from which inner race inserts are to be formed, or placed within a slotted cylinder, as in the case of the coil shown in FIGURE 3 from which outer race inserts are formed, and a cut is made longitudinally of the coil to divide it into a plurality of ring-like race inserts. In the alternative, the blank may be cut beforehand to a length which after being formed into an intermediary results in the desired predetermined circumference. In the latter situation the cutting operation can be omitted or be limited to truing-up the ends of the intermediary.

Next, the inserts are heat treated while confined in a perforated cylinder as shown in FIGURES 4 and 5 to prevent warping of the inserts. The heat treating step may be omitted should a blank of a suitable hard material, such as stainless steel, be employed. Completed inserts as used in a swivel joint are described in the copending application of G. W. Bloomquist, Ser. No. 405,935, filed Oct. 23, 1964, now Patent No. 3,336,057, and in FIGURE 8 of the instant application.

More particularly the drawings show one arrangement of apparatus suitable for carrying out the invention. The details of the apparatus are not essential and other forms may be used.

As best shown in FIGURE 1, a blank or strip 12 of a hard material, such as steel, is shown in the initial forming operation. The blank may be cut beforehand to the desired length to form a single race insert or, as shown in FIGURE 1, it may be elongated so that a number of race inserts can be made simultaneously. Thus, an elongated blank is defined as one from which a plurality of race inserts can be made. For the purpose of brevity the following description will be directed primarily to forming a plurality of race inserts from an elongated blank.

The elongated blank is usually made of annealed steel with smoothed edges to prevent fractures during the forming process. The elongated blank is formed into an intermediary coil by passing it through a set of upper and lower rough forming rollers 14 and 16 and a set of upper and lower finishing rollers 18 and 20. A set of opposed upper and lower guide blocks 22 and 24, respectively, position the elongated blank as it is fed between the rollers. The upper rough forming roller has a concave rolling face 26. The lower rough forming roller has a mating convex rolling face 28. When the elongated blank is fed between the rough rollers, the initial forming of the transverse cross-sectional radii of the race inserts take place. The upper finishing roller 18 is provided also with a concave rolling face 30 and the lower finishing roller is provided with a mating convex rolling face 32. The radii of the rolling faces 30 and 32 are dimensioned to correspond to the dimensions of the radii of the transverse concave cross-sections of the desired finished inserts.

In the particular apparatus shown, each of the rollers 14, 16, 18 and 20 are fastened to rotatable shafts 34, 36, 38 and 40, respectively. The upper shafts 34 and 38 are mounted for vertical adjustable movement in a frame 42. The shafts are driven by a plurality of gears 44, 46, 48 and 50. The gears, as best shown in FIGURE 6, are preferably driven in unison by a drive gear 52 which is connected to a conventional powered drive train. The gears are spaced vertically from one another an adequate distance to permit interconnected rotation while permitting the upper gears 44 and 48 to be adjusted vertically with respect to the lower gears 46 and 50.

In FIGURE 7, one form of a mechanism for adjusting the upper rollers with respect to the lower rollers is shown. The mechanism will be described with reference to the rough roller 14 it being understood that roller 18 is likewise similarly adjustably mounted. The adjusting mechanism generally comprises a roller bearing 60 mounted in an eccentric sleeve 62 positioned in a seat in the frame 42. By rotating the sleeve 62 in any suitable manner, as for example by using a spanner wrench, the roller 14 is adjusted with respect to the lower roller 16 to vary the distance between the peripheries of the rollers and thus the amount of pressure applied to the elongated blank as it is passed therebetween. Basically, the amount of pressure applied is just sufficient to force the elongated blank through the forming operation and to obtain the desired cross-section curvature.

After the elongated blank 12 has been passed between the rough forming and finishing rollers 14, 16, 18 and 20, it is formed into the intermediary coil by pushing or forcing it against a deflecting element, such as a curved shoe 64. The shoe 64 is mounted on the frame 42 in a manner such that it is readily adjustable in the horizontal plane so that the diameter of the coil can be varied. In other words, by moving the shoe toward the finishing rollers the diameter of the intermediary coil and thus the diameters of the final race inserts will be reduced. When it is desired to enlarge the diameter, the shoe 64 is moved away from the rollers 18 and 20. Separate shoes may also be employed to obtain different curvatures or as shown in FIGURES 9 and 10 different shoes may be used when rolling either inner or outer race inserts. Similarly, other deflecting elements, such as rollers, have been used satisfactorily. As should be apparent when the shoe is in the position shown in solid lines in FIGURE 1, the elongated blank will be formed into an intermediary coil which will become inner race inserts having concave transverse cross-sections facing radially outward. When the shoe is placed in the position shown in phantom lines in FIGURE 1, outer race inserts will eventually result and will be formed with their concave transverse cross-sections facing radially inward.

At this point in the method the intermediary coil will have been formed and will be of a desired predetermined diameter. The intermediary coil is cut in the apparatus illustrated by placing it against a guide member and cutting it parallel to the longitudinal axis of the guide member to make a plurality of race inserts all of the same circumference.

As best shown in FIGURE 2, when cutting the intermediary coil into inner race inserts, the guide member is in the form of a mandrel 70 having a longitudinal groove 72. A cutter 74 is mounted to pass within the groove 72 and move longitudinally of the mandrel 70. The coil is forced over the mandrel and the cutter 74 passed along the groove cutting the coil into a plurality of inner race inserts. The intermediary coil is actually rolled to a slightly smaller diameter than is needed so that it must be expanded and forced over the mandrel. This is done so that the cut insert will fit tightly in its respective groove in the inner member of the swivel joint.

As best shown in FIGURE 3, the guide member used to cut the intermediary coil into outer race inserts as in the form of a rigid cylinder 80 having a longitudinal slot 82. A dual cutter having two parallel cutter blades 84 is positioned to pass longitudinally through the slot in the cylinder. The coil is then inserted in the cylinder and the cutter passed through the slot 82 to cut the coil into a plurality of outer race inserts. The width of the groove cut in the coil and thus the circumferences of the resulting outer race inserts can be predetermined so that each insert may be compressed and inserted within the outer member of a swivel joint.

After the coil has been cut to form inserts, the inserts are placed either individually, or preferably still intact as a cylinder, into preforated cylinders for the heat-treating operation. As best shown in FIGURE 4, a perforated cylinder 90 is employed for heat-treating the inner race inserts. A plug 92 is inserted at either end of the inserts (only one plug being shown) for preventing excessive expansion or contraction during the heat treating operation. As best shown in FIGURE 5, a perforated cylinder 94 is employed for heat treating the outer race inserts. An elongated block 96 is placed between the opposed free ends of the race inserts to prevent excessive expansion and contraction during the heat treating operation. In both cases the perforated cylinders 90 and 94 constrain the inserts, which otherwise may warp during the heat treatment due to the stresses developed during the rolling process. The perforations in the cylinders are provided to allow a quenching media to reach the unexposed sides of the inserts. The heat treatment may be done by any conventional process which will obtain the desired hardness. Preferably a hardness of between 48–52 $R_c$ is preferred; however, this hardness range is not critical.

Although in the preferred method the heat treating step is employed, this step is unnecessary should an initially hard material be used. For example, a metal such as stainless steel having a Rockwell hardness of 48 $R_c$, may be satisfactorily used without heat treatment.

As an illustration of how the method is performed, a method for making a plurality of typical race inserts for a swivel joint bearing like the one shown in FIGURE 8 will be described. FIGURE 8 shows a portion of a swivel joint which includes an inner tubular member 100 having annular grooves 101 and an outer tubular member 102 which fits over the inner tubular member and is provided with annular grooves 103. The annular grooves in the inner tubular member are 4.56 inches in diameter, as indicated by the reference character $b$ in FIGURE 8, and the annular grooves in the outer member are 5.50 inches in diameter, as indicated by the reference character $c$, and the balls are of ¼-inch diameters. The rollers 14 and 18 are adjusted to obtain a pressure just sufficient to force the elongated blank 12 through and against the shoe 64 and to form a ¼-inch cross-section curvature. Where different shoes are used they are placed in the position shown in FIGURE 9 to form inner race inserts or in the position shown in FIGURE 10 to form outer race inserts. The deflecting surface of the shoe shown in FIGURE 10 is also spaced horizontally from the rollers a slightly greater distance when forming outer race inserts since the circumferences of the outer race inserts are larger. For the swivel joint bearing illustrated, the radius of the curved face of the shoe for making inner race inserts is 2.437 inches, as indicated by the reference character $d$ in FIGURE 9, and the center of the curve lies on the center lines of the finishing rollers 18 and 20, at a point 2.437 inches from the inner periphery of roller 20, as indicated by the reference character $d$ in FIGURE 11. The radius of the curved face of the shoe for making outer face inserts in the illustration is 2.750 inches, as indicated by the reference character $e$ in FIGURE 10, and the center of the curve also lies on the center lines of the finishing rollers, 2.75 inches from the inner periphery of the upper roller 18 as indicated by the reference character $e$ in FIGURE 11. The outer diameters of the finishing rollers in the illustration are 3.25 inches. Blanks of any size may be used but, for the illustration, the blank will be assumed to be 8 inches in length and 1/16 of an inch thick. The width of the cutters shown in FIGURE 3 would be 5/8 of an inch and the cutter shown in FIGURE 2 would be 1/32 of an inch. Assuming the blank was of an annealed carbon steel, the heat treatment would be employed to produce the desired hardness of 48–52 $R_c$. Aftr the heat treatment, the inserts and balls are placed in the swivel joint bearing as shown in FIGURE 8 and the aforementioned application and the bearing is completed.

As is readily apparent, one of the advantages of the subject method is that either one or a plurality of race inserts both of the inner and outer type may be made inexpensively and without the necessity of machining. Another advantage is that the diameter and the transverse cross-sectional radius of the race insert can be formed in a single operation. Still another advantage is that several race inserts can be formed, cut and heat treated simultaneously so that each of the resultant race inserts will have substantially the same characteristics of every other race insert. Still another advantage is that the resulting race inserts are easily installed in their respective bearing assemblies. Another important advantage is that the resulting male and female race inserts are matched since both are formed on the same rolls. These and other advantages are all readily apparent from the foregoing description.

Although the invention has been described in its preferred form with a certain degree of particularity, it is understood that the present disclosure of the preferred form of the subject method has been made only by way of example and that numerous changes in the details of the steps and the apparatus employed may be resorted to without departing from the spirit and scope of the invention as hereinafter claimed.

I claim:
1. The process of making bearing race inserts comprising the steps of shaping a blank by rolling it between two sets of rollers having mating concave and convex surfaces into an intermediary of a predetermined diameter and having a curved transverse cross-section of predetermined radius, placing the intermediary into a perforated cylinder, blocking the ends of the intermediary to prevent expansion and warping, and heat treating the constrained intermediary to produce a desired hardness.

2. The process defined by claim 1 wherein said shaping step includes pushing said blank against a deflecting element to form said predetermined diameter.

3. The process defined by claim 1 wherein the blank is cut to a predetermined length before rolling whereby said intermediary has the same circumference as the final race insert.

4. The process of making bearing race inserts comprising the steps of shaping an elongated blank by rolling it between two sets of rollers having mating concave and convex surfaces into an intermediary coil of a predetermined diameter and having a curved transverse cross-section of predetermined radius, cutting said intermediary coil into a plurality of race inserts each of the same circumference, placing the inserts into a perforated cylinder, blocking the ends of the inserts to prevent expansion and warping, and heat treating the constrained inserts to produce a hardness of from 48–52 $R_c$.

5. The process defined by claim 4 wherein said step of cutting said intermediary coil includes placing it against a guide member and moving a cutting blade through the periphery of said intermediary coil while it is against said guide member.

References Cited

UNITED STATES PATENTS

| | | | |
|---|---|---|---|
| 341,816 | 5/1886 | Parker | 308—216 |
| 1,951,801 | 3/1934 | Lyon | 29—417 |
| 2,741,826 | 4/1956 | Hall | 29—148.4 |
| 3,229,353 | 1/1966 | Morrison | 29—148.4 |

THOMAS H. EAGER, *Primary Examiner.*

U.S. Cl. X.R.

29—415, 417; 308—216